United States Patent
Strickland

(10) Patent No.: US 7,353,995 B2
(45) Date of Patent: Apr. 8, 2008

(54) METHOD AND SYSTEM FOR AUTOMATED SETUP OF CONFIGURATION PARAMETERS FOR A CONTROL PROCESSOR

(75) Inventor: Stephen Scott Strickland, Terrace Park, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/818,322

(22) Filed: Apr. 5, 2004

(65) Prior Publication Data

US 2004/0222300 A1 Nov. 11, 2004

Related U.S. Application Data

(60) Provisional application No. 60/461,702, filed on Apr. 10, 2003.

(51) Int. Cl.
*G06K 7/10* (2006.01)
(52) U.S. Cl. .................................. 235/462.01
(58) Field of Classification Search ................................
235/462.01–462.49, 454
See application file for complete search history.

(56) References Cited

U.S. PATENT DOCUMENTS

| | | | | |
|---|---|---|---|---|
| 4,825,058 A * | 4/1989 | Poland | ................... | 235/462.01 |
| 5,229,591 A * | 7/1993 | Heiman et al. | ......... | 235/462.25 |
| 5,519,878 A | 5/1996 | Dolin, Jr. | .................... | 395/800 |
| 5,777,315 A * | 7/1998 | Wilz et al. | ............. | 235/462.15 |
| 5,942,739 A | 8/1999 | Zvonar et al. | ......... | 235/462.01 |
| 6,000,825 A | 12/1999 | Fredriksson | ................ | 364/138 |
| 6,698,656 B2 * | 3/2004 | Parker et al. | .......... | 235/462.01 |
| 6,902,114 B2 * | 6/2005 | Hashimoto et al. | .... | 235/462.25 |

FOREIGN PATENT DOCUMENTS

DE 10049539 A1 3/2002

OTHER PUBLICATIONS

PCT International Search Report, Mailed Jan. 24, 2005.
PCT Written Opinion of the International Searching Authority.

* cited by examiner

*Primary Examiner*—Jamara A. Franklin
(74) *Attorney, Agent, or Firm*—José R. de la Rosa

(57) ABSTRACT

A method and system for configuring a control processor in a process control system. Barcode configuration data contain operating features of a process control network component is entered via an optical scanner and the data is forwarded to a control processor. The control processor uses the data to generate a configuration file used to setup or modify processor operating parameters.

38 Claims, 5 Drawing Sheets

Start Frame= "001"        Forward Direction/Start Frame Sequence
Function="01"             Type of modification to be made- Add device
Device Type="05"          Slave Drive
Parameter Type="02"       Add Address
Address="04242"           Address on Process Control Network
Checksum="36"             Number used to verify data integrity
End Frame="110"           End Data/ 2's Compliment of Start Frame

Fig. 4

Machine Serial Number

CNC Configuration Data

Fig. 5

1. Ramp Function = 23
2. Torque Limit= 2
3. Speed Setpoint =33
4. Motor Select =21
5. 0=No change to parameter
6. 0=No Change to parameter
7. 0=No Change to parameter
8. Pulse Enable =11

Fig. 6

G91 (* set to incremental mode )
F5 (* set cutting feedrate to 5 inches/minute )
M03 (* start tool spinning )
G01 Z-1 (* set to regular cutting speed and plunge 1 inch)
X2 (* cut horizontally 2 inches )
X.5 Y2 (* diagonal cut )
G03 X1 Y1 I1 J0 (*circular interpolation counterclockwise)
G00 Z1 (* set to rapid feed rate and pull up 1 inch )
M05 (* stop tool spinning )
M02 (* end program )

Fig. 7

METHOD AND SYSTEM FOR AUTOMATED SETUP OF CONFIGURATION PARAMETERS FOR A CONTROL PROCESSOR

CROSS-REFERENCES TO RELATED APPLICATIONS

This application claims priority to, and incorporates by reference herein in its entirety pending U.S. Provisional Patent Application Ser. No. 60/461,702 filed Apr. 10, 2003.

FIELD OF THE INVENTION

The present invention is generally directed to a method and system for configuring a control processor. More specifically, the invention is related to the transfer of configuration data to a control processor.

BACKGROUND

The concept of bar code technology was first visualized in the United States around the late 1960s, as a method of automating data collection in the computer industry. However, railroad car tracking and supermarket purchases were two of the earliest and perhaps best know applications of early barcode technology. The railroad industry, with its large number of rail cars moving through switching yards, from many different companies, needed some way of identifying these rail cars quickly. The use of barcodes at track side was thought to be the answer. Similarly, supermarkets wanted a way of tracking inventory as goods passed from vendor to store shelves. Shortly thereafter, common barcodes started appearing on grocery shelves in the early 1970s as UPC code to automate the process of identifying grocery items. Today, barcodes are just about everywhere and are used primarily for identification and inventory management in almost all types of business.

When barcodes were first implemented in business processes, the hope was to automate repetitive processes, reduce human error and increase productivity. More specifically, barcode users wanted to eliminate or minimize the practice of employees manually typing numbers into a keyboard. It was hoped that this could also speed the movement of products through the checkout lines and manage inventory much more efficiently. Nowadays, barcodes and barcode readers are being used in just about every aspect of the retail industry. Barcoding has become one of the most efficient ways to track inventory, determine the status of a package in transit or locate parts in a warehouse.

In much the same manner that barcodes have been used to improve data input, control processors have been used to improve the efficacy of automation and computer controlled processes. Computer Numerical Controls (CNC) have been used to control repetitive operations in a variety of applications. The breadth of CNC use ranges from small job shops to fortune 500 companies. One of the advantages of using CNCs in the process control and automation industry is the minimization of operator intervention. Moreover, the use of CNCs in process automation minimizes operator fatigue, operator error and improves the production of consistent and accurate creation of workpieces. In effect, CNCs have significantly enhanced the control over manufacturing and processing equipment. Another advantage to the use of CNCs is the improved level of operational flexibility in accommodating manufacturing and process control requirements.

The process of providing operational data used by control processors was traditionally coordinated through the manual input of configuration data and program instructions. Configuration parameters were generally established by the CNC manufacturer and conveyed to the end user in the form of paper documents or electronic files. These vendor provided electronic files and paper documents were used by servicing technicians to setup CNCs and communicate with associated hardware such as drives, motors and machine tools. For the most part, CNC configuration as well as CNC programming was a manual effort which required the integration of the CNC with various control system hardware. However, a highly flexible and efficient means of instructing CNC operation has yet to be developed.

Accordingly, there is a need for a means of expediting the configuration and programming requirements of a control processor while minimizing operator intervention and human error. The present invention provides a system and method by which setup or modification of control processor configuration parameters and program instructions are achieved through the use of predefined barcode encoded data.

SUMMARY OF THE INVENTION

It is an objective of the present invention to provide a method and system for efficiently configuring or programming a process control system through the use of predetermined barcode data.

It is another objective of the present invention to utilize simple barcode data to correlate with operating parameters and instructions which are more detailed and resident within a local CNC or a remote computer.

It is yet another objective of the present invention to cause the reconfiguration of other existing and affected components, as a result of parameter or instructions entered on behalf of one or more newly installed or modified devices.

In application, the present invention is directed to the use of barcode data as a means for minimizing operator intervention, and for expediting the configuration of system parameters.

According to the principles of the present invention, there is provided a method and system which utilizes a barcode scanner as an input device for inputting configuration data and/or instructions into a control processor. In accordance with one embodiment of the present invention, there is further provided within a process control system, a barcode scanner for detecting a set of barcode encoded configuration parameters of a control component to be added to the control system wherein the control processor controls the operation of the control component; means for transmitting signals to the control processor representative of the decoded set of barcode encoded configuration parameters; means for detecting the transmitted signal within the control processor; means for correlating the transmitted data with control component specific configuration parameters; means for storing control component specific configuration parameters in a memory accessible by the control processor; and means for creating and storing an executable configuration file containing component specific configuration parameters for controlling the operation of the control components.

BRIEF DESCRIPTION OF THE DRAWINGS

FIG. 4 is an illustration of a sequence of parameters used to configure a CNC.

FIG. 5 is an illustration of barcode data for use in identification and configuration of a CNS.

FIG. 6 is an illustration of configuration data used to make parameter changes.

FIG. 7 is an illustration of a barcode format.

DETAIL DESCRIPTION

Figure 1:
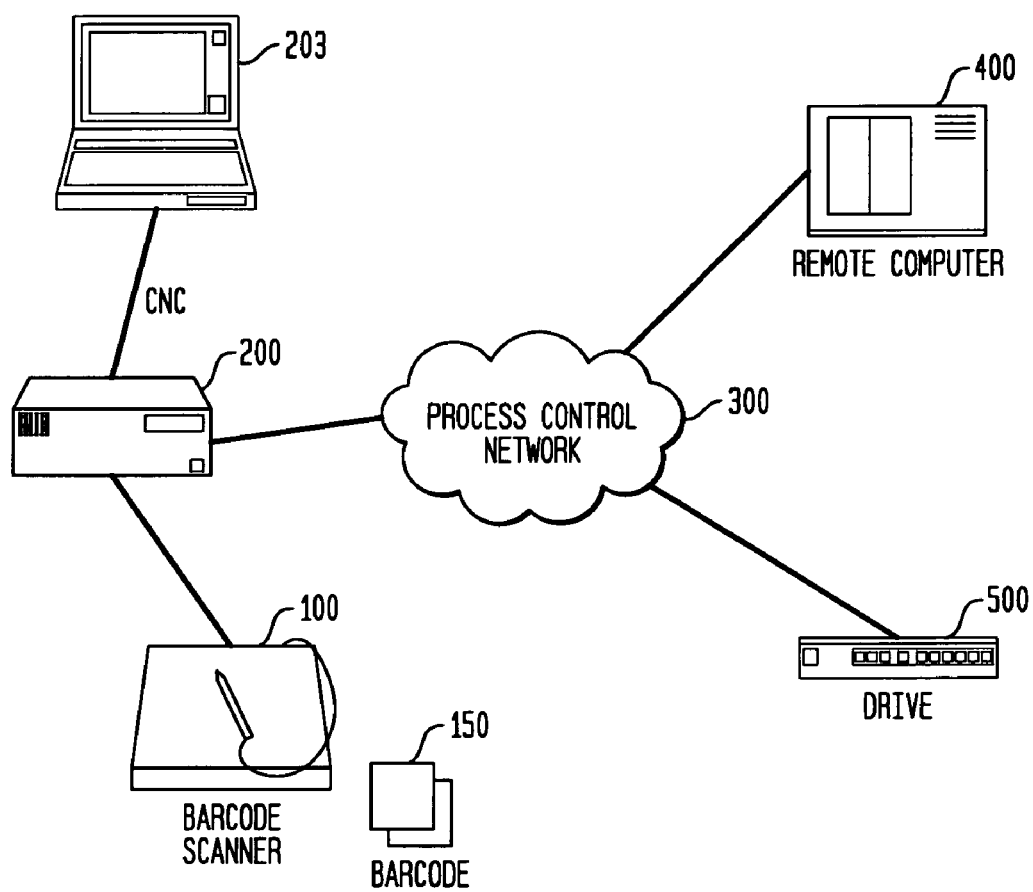
FIG. 1 is an illustration of a process control system incorporating the use of the present invention.

FIG. 1 illustrates an environment in which a first embodiment of the invention is used to configure a control processor. For purposes of illustration and not by way of limitation, a CNC will be used to illustration the various embodiments of the present invention. Shown in FIG. 1 is a barcode scanner 100, barcode 150, a CNC 200, communications network 300, new drive 500 and a remote computer 400. During the installation and configuration of CNC 200 or the addition of drive 500 to the system, a barcode scanner 100 is used as the input device for accepting CNC configuration parametric data. Although the barcode scanner 100 is shown in FIG. 1 as a wand scanner, there are several other types of optical scanners applicable to the present invention. For example and without limiting the type and functional nature of the scanner, the barcode scanner 100 may take the form of fixed, portable, fixed batch, portable batch, and portable RF scanners.

Fixed scanners remain attached to their host processor and generally transmit one data item at a time as the data is scanned. As applicable to the present invention, a fixed barcode scanner maybe a stationary and external device or an integrated module within the CNC 200 operating in a batch or non-batch mode. Alternatively, portable and portable batch scanners may be used as an attachable and mobile device during configuration or modification of the CNC 200. Portable and portable batch scanners are battery operated devices which transmit data as it scans or stores the data in the scanner's memory for later batch transfer of the data to the CNC 200. On the other hand, portable RF scanners are battery operated devices which generally transmit real-time data wirelessly. It should be understood however, that with the present invention, all the scanners referenced above, may operate in local or on-line mode, in either real-time or batch transfer mode of communication and may operate in both a unidirectional or bidirectional manner. In the bidirectional mode, a local processor or remote processor serving as the source for configuration setup or modifications may instruct an installer or technician in the configuration and/or configuration process through the interactive display of data on display monitor 203. The display monitor 203 includes but is not limited to display devices ranging from a dumb terminal to a high speed computer having its own operating system and application software.

The barcode scanner 100 may operate in a variety of ways and include technology ranging from the use of LED, CCD or Laser technology as well as any other optical means for capturing barcode images. Generally, a barcode scanner 100 uses a photosensor to convert the barcode 150 into an electrical signal as it moves across a barcode. The barcode scanner 100 then measures the relative widths of the bars and spaces, translates the different patterns back into regular characters, and sends them on to a processor. Every barcode generally begins with a special start character and ends with a special stop character. These codes help the barcode scanner 100 detect the barcode 150 and determine whether it is being scanned forward or backward. Some barcodes 150 contain special delimiters and may include a checksum character just before the stop character. A checksum is calculated when the barcode 150 is generated using the characters in the barcode 150. The barcode scanner 100 performs the same calculation and compares its answer to the checksum it read at the end of the barcode. If the calculated and read checksums do not match, the barcode 150 scanner assumes that something is wrong, discards the data, and prompts the user to try again. The barcodes 150 contemplated for use with the present invention comprises both standardized and proprietary barcode formats.

Laser scanners use a moving pinpoint of light to illuminate the barcode 150, and a single photocell receives the reflected light. Most laser scanners sweep the laser beam horizontally using an electronically controlled mirror. Laser scanners tend to be quick and precise and can often read denser barcodes than other technologies. A primary advantage of a laser scanner is depth of focus, since a laser beam diverges very little with distance, scanners of this type generally have a working range from roughly 1 inch (2.54 cm) to 12 inches (30.48 cm). By increasing laser power and narrowing the angle of beam sweep, special long-range scanners can read at ranges as long as to 30 to 40 feet (9 to 12 m). Since the laser beam is swept horizontally at a fixed angle, the length of the scan line on the target increases as the distance increases. Generally, 2-dimensional laser scanners sweep the beam horizontally and vertically at the same time, creating a raster pattern. This type of scanner is used to read 2-dimensional barcodes like PDF-417.

Alternatively, interlocking pattern scanners use mirrors to create a grid of scan lines. This is the type of barcode scanner most often used in grocery store checkout lines. The advantage to using this type of scanner is that when a barcode 150 passes the scanner the likelihood is that at least one of the scan lines will capture a clean cross section of the barcode. In this mode of operation, the operator does not have to aim the scanner or carefully position the barcode. The result is faster overall operation. Another characteristic of scanners of this type is that the optics can be designed to appear as though laser beams are emitted from different points of origin although only one laser is used. In this manner the scanner has the ability to wrap the scan pattern around corners if necessary.

In LED (light emitting diode) technology, a single light-emitting diode illuminates a small spot on the barcode and a photocell measures the amount of light reflected. As the LED and photocell scan across the barcode, the pattern of bars and spaces is captured and decoded. In a wand scanner, light is focused through a small transparent ball at the tip-to scan, the operator swipes the wand across the barcode 150. The tip of the wand generally has to be in physical contact with the surface of the barcode 150.

Alternatively, slot readers look like credit card readers and keep the LED and photocell in one place while the barcode, which is typically printed on a credit card, slides through a slot in the reader. As long as the operator can sweep the scanner from one end of the barcode to the other at an even speed without wandering off the code, the maximum width of a barcode is theoretically unlimited.

CCD stands for Charge-Coupled Device and refers to a single row of photocells on a single semiconductor chip. Unlike a single photocell which can see only one spot on the barcode at a time, a CCD can see a cross-section of the whole barcode 150 at once. The barcode 150 is generally illuminated by a row of light-emiting diodes built into the scanner. CCD scanners are also available with 2-dimensional arrays and function like miniature electronic cameras to capture a rectangular image. This type of scanner is often called an Imager, and is used to read 2-dimensional barcodes like PDF-417, DataMatrix, or Maxicode. The target is generally illuminated with a group of light-emitting diodes. CCD scanners do not have to be in direct contact with the surface of the barcode, but their depth of focus is somewhat limited. Most CCD scanners have a working range from approximately 0.25 in (6.35 mm) to 1.0 in (25.4 mm), although there are some scanners available with a slightly greater range. The width of the CCD sensor array in the scanner limits the maximum width of a barcode 150 that can be scanned. The scanner 100 however is generally unable to read a barcode 150 if the barcode 150 is wider than the scanner scanning area.

Figure 2:
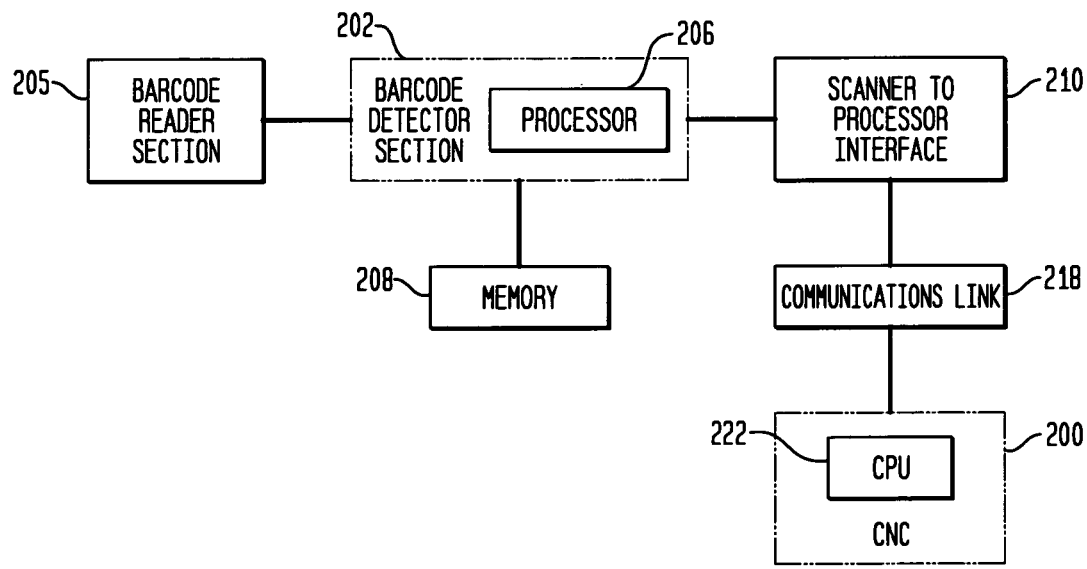
FIG. 2 is an illustration of component parts of a barcode scanner.
Figure 3:
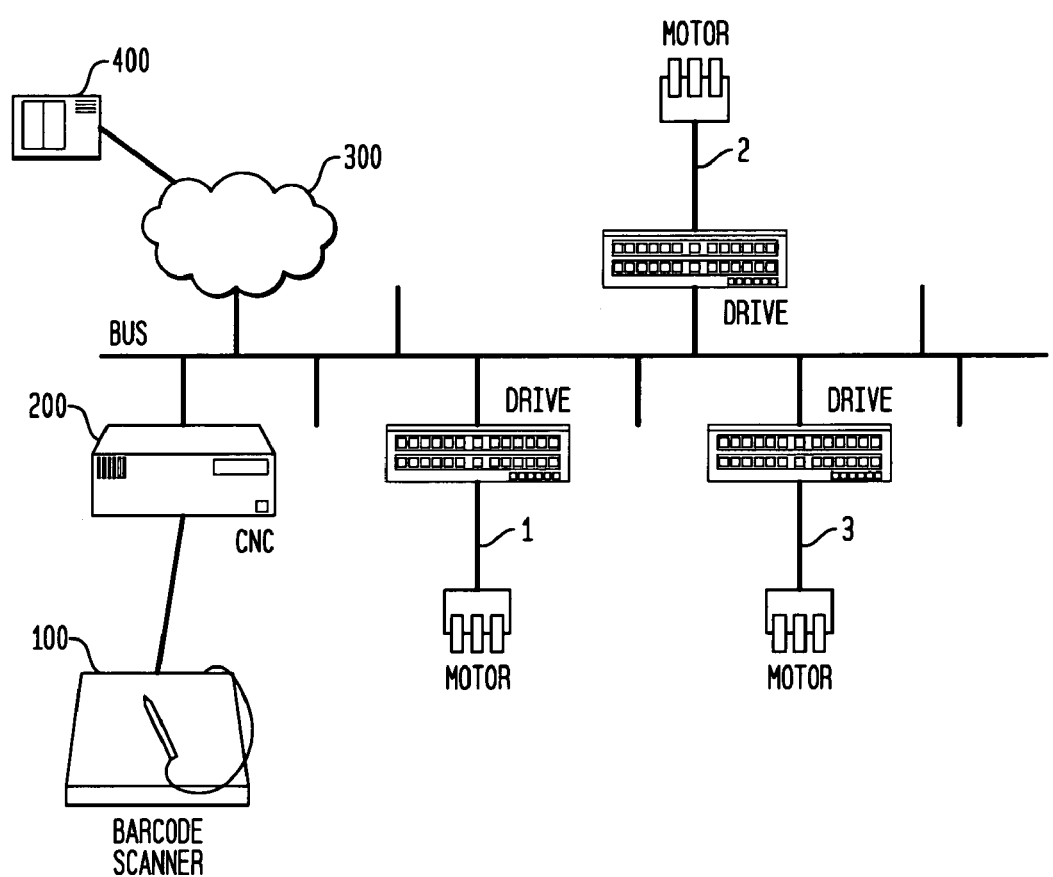
FIG. 3 is an illustration of a control processor and controlled components in process control system.

Regardless of the specific hardware and operational nature of the barcode scanners referenced above, a barcode scanner 100 generally comprises a reader section 205 and a decoder section 202 as shown in FIG. 2. The reader section 205 is generally responsible for the scanning or capturing of a barcode or series of barcodes and for outputting an electrical signal to the barcode decoder 202 which corresponds to the bars and spaces of the barcode. The barcode decoder 202 is generally a separate section of the barcode scanner 100 which accepts the electrical signal representative of the digitized bar and space patterns and decodes the electrical signal into usable information for storage in memory 208. The reader 205 and barcode decoder 202 generally share the use of a processor 206 and associated memory 208, although separate and dedicated processors and memory for each of the reader and decoder sections 205, 202 may be used. The memory 208 may include one or more ROMs, PROMs, EROMs, EPROMs, RAMs, SRAMS, DRAMs, FPM DRAMS, EDO DRAMs, SDRAMs, DDR SDRAMs, RDRAM, MEMORY STICKS, FLASH MEMORY, VIRTUAL MEMORY and/or electronic circuitry cable of storing program instructions and/or configuration data.

The information is then conveyed to the processor in CNC 200 through a scanner-to-processor interface 210. The data on barcode 150 may be placed on any tangible medium which is able to retain the barcode sequence and is optically readable by scanner 150. The. medium may be for example, paper, plastic, or metal.

In one mode of operation, configuration data is expressly encoded within the barcode 150 and is preferably placed on a plastic card or document. The barcode scanner 100 reads data from the barcode 150 and transfers the decoded data to the CNC 200. As previously mentioned the barcode scanner 100 first scans and detects the data in the reader section 205 and then decodes the data through its decoder section 202. The decoded data is then transmitted to the CNC 200 via a communications link 218 through the scanner to processor interface 210. The communications link 218 may take the form of a wireless link as used in RF scanners or may as shown in FIG. 1 utilize a direct cable connection such as an RS-232, USB, or Optical link or any other physical connection.

Data sent to the CNC 200 is used to configure one or more CNC configuration parameters. More specifically, these configuration parameters are used to locally generate an executable configuration file in the CNC 200 for operational control of system components. The resulting configuration file is operationally representative of the designated configuration parameters. For example, a simple sequence of the following parameters may be used to reconfigure the CNC's configuration file to add drive 500 to a process control network 300.

In FIG. 4, data input is started by executing an input program to accept and process the data entering the CNC 200 at the scanner-to-processor interface 210. The execution of the input program causes the CPU 222 in the CNC 200 to monitor and interpret the data sequence and to isolate parameter designations. Barcode data scanned during a swipe of the barcode 150 with barcode scanner 100 is forwarded to the reader and decoder sections 205, 202 and routed by scanner processor 206 to the scanner-to-processor interface 210. Data received by the CNC 200 is interpreted and may be stored in accordance with the CNC's specific configuration architecture. More specifically, parameter data may be stored in a CNC configuration file in non-volatile memory and in pre-selected memory address designations.

The parametric data is interpreted by following a standardized command format structure. In the above example, the parametric data used to add new drive 500 follows the specific data sequence shown in FIG. 4. The start frame is detected as "001" followed by the "01" add command function designation. Once the add command is detected, the CPU 222 will correlate the command with a sequence table which designates the order of the parameters to be processed. Using this reference sequence table, CPU 222 will expect reception of device type, parameter type, address, checksum and end of frame data sequence data. Data separation is designated through the use of a special character delimiter such as an asterisk ("*"). In this manner, the received parameter data is used to create or modify a configuration file in CNC 200.

In alternate embodiment, data sent to the CNC 200 as in the above example is interpreted by the CPU 222 to mean that one or more pre-determined sets of CNC parameters will be used to configure the CNC 200. For example, if the barcode data shown in FIG. 4 is used, interpretation of any of the numeric data between the start frame and end frame may used to correlate with a set of pre-determined parameters stored in memory. The "01" designation following the start frame may be interpreted to configure the CNC 200 to operate the drive 500 as a slave, with predefined and specific maximum spindle speed, rapid rate, pitch error compensation, communications protocol and backlash compensation parameters—just to name a few. In effect, a single character reference may be correlated with a particular set of operational parameters. The set of parameters may be as small or as large as necessary to operate the drive 500 in its environment. It must be understood however, that the barcode data may contain one or more numbers (and/or alphabetic characters if under a different format) which may be correlated with sets and subsets of predefined parametric designations and may be applied to all embodiments of the present invention. In this mode of operation, the data is not the actual parametric value of a particular parameter but a designation for the selection and use of one or more parameter sets.

Moreover, a barcode 150 containing the serial number of a component to be added may be used not only to identify the specific device, but to ascertain the manner in which it will operate on the process control network 300. Based on its physical configuration, a system component may only operate in a limited manner. For example, a digital drive having no analog capability will only operate in a digital environment. Accordingly, a barcode having a device serial number as an input to the CNC 200 will configure and identify component functionality. The serial number is provided by the component vendor and designates component attributes in much the same manner that a car and its attributes are identified through its VIN number. However, it should be understood that although these CNC parameters are factory-set, barcode input of all or some of these parameters will override factory settings.

As shown in FIG. 5, a two barcode sequence may be used to identify the physical component and attributes, while the CNC configuration data may be used to designate its operational features. For example, an input of the serial number from FIG. 5 to the CNC 200 may for example be used to identify the component physical attributes and to identify drive 500 as a digital drive having the ability to select up to four (4) motor types. The configuration data may designate a parameter change as shown in FIG. 6

TABLE 3

| | |
|---|---|
| 1. | Ramp Function = 23 |
| 2. | Torque Limit = 2 |
| 3. | Speed Setpoint = 33 |
| 4. | Motor Select = 21 |
| 5. | NULL |
| 6. | NULL |
| 7. | NULL |
| 8. | Pulse Enable = 11 | while leaving the other modifiable parameters unchanged. Operationally, the data is preferably read and understood sequentially and a checksum calculated through a predefined algorithm. As shown above, CNC configuration data sequentially corresponds to the parameter sequence structure (sequence table) shown in FIG. 6. In the above example, the three CNC parameters 5,6,and 7 were not changed due to the entry of "Null" in the fifth, sixth and seventh sequence slot of the parameter sequence. However, parameter slots 1-4 and 8 were changed and assigned the numeric values "23,2,33,21 and 11. As noted above, alpha-numeric data read from a barcode may represent the actual parameter or a value/designation which correlates to one or more sets of parameters stored in memory. For example, the reference to "motor select =21" may designate one parameter value or may designate a set of parameters such as the motors' feed rate designation, spindle designation, tool designation and/ or other miscellaneous functional designations. In the above example, a start sequence of "001", end sequence "110", and an asterisk ("* ") delimiter are used to sequence the data. The changes to these CNC parameters are stored in a new or revised configuration file within non-volatile memory. As shown above, CNC parameters may be modified by providing sequence numbers which correspond to known CNC parameters and which follow a pre-determined format structure or table sequence. Of course, other read sequences (parallel for example) and format structures may be used without departing from the scope of the present invention.

In an alternate embodiment of the invention, data sent from barcode scanner 100 to CNC 200 is accepted and used by CNC 200 as input to configuration software (configuration tool). For instance, an installer in the field may be tasked with the addition of drive 500 to the process control network 300. In preparing for the installation of this drive, a configuration label (barcode) shipped with the drive 500 or some other barcode encoded configuration document may be scanned to configure the CNC 200 to properly operate with drive 500. In this manner, configuration errors are minimized or eliminated and the speed by which such equipment is installed is significantly enhanced. Interactively, the configuration tool displays on monitor 203, each of the parameters and/or parametric description of the modified parameters. In response, the technician confirms or rejects each of the parameter settings, or manually overrides the proposed settings before the parameters are used to create or modify a configuration file. For example, the sequence number designation of "Speed Set-point=23" may designate the use of a maximum speed velocity of 50 mm/sec, and the use of a cylindrical speed profile. The proposed speed and profile settings may then be displayed in graphic form on display monitor 203. The technician may then confirm or reject the proposed settings, or designate other parametric settings.

In another embodiment of the invention, data received at the CNC is forwarded to a remote computer 400. Barcode data is read from a component label or configuration document of the component to be configured. The data is scanned and forwarded to CNC processor 222 for initial processing. From CNC 200, the data is then forward to a remote computer 400 via a communications network 300. Communications network 300 includes but is not limited to the Internet, PSTN, LAN, local and remote bus systems, and wireless networks and any combinations therewith. The data is transmitted to remote computer 400 in a form substantially consisting of the same data transmitted by the barcode scanner 100 to the CNC 200. The transmitted data is however, modified to the extent necessary by the CNC 200 to conform to the protocol (i.e., TCP/IP) used to communicate through process control network 300. The data received at remote computer 400 is then used as input to a configuration tool to create a configuration file and/or is used to correlate the data with CNC parameters stored within the memory of remote computer 400. Once the configuration file is generated and/or one or more sets of CNC parameters have been determined, a response message containing a new configuration file or one or more sets of CNC parameters is sent back from remote computer 400 to CNC 200. The response data is preferably sent as a sequence of parametric data corresponding to an associated sequence table or as a configuration file to be readily used by CNC 200. The response data is preferably sent in an XML format, although other formats may be used. By using an XML format, parameter data, instructions and any associated pictorial information (for monitor display) can easily be relayed back to the CNC 200 for processing, storage, display and setup. Once the data is received, CNC 200 may use the parametric data to generate its own configuration file or apply the configuration file created by the remote computer 400. The changes are stored in a configuration file resident in memory 224.

In another embodiment of the invention, CNC programs maybe entered via the barcode scanner 100. For example, a field examination of the CNC 200 may reveal the corruption of or error in a CNC program. Rather than attempt to access the CNC 200, through an access terminal and download or modify the existing program file, a field technician may alternatively access a barcode encoded document containing frequently used or customized set of program instructions. For instance, an alphanumeric barcode format as shown in FIG. 7, such as Code 128, PDF 417 or MaxiCode may be used to upload program statements to CNC 200.

Barcode scanning may be used for other operational modifications to process components. In yet another embodiment of the present invention, the same process used to modify or initially setup CNC operational parameters discussed above, may be used to enter configuration parameters, data or files on other associated network devices (e.g. control components). More specifically, the present invention may be used to expedite the customized configuration of CNC controlled network devices requiring re-programming as a result of changes made to CNC configuration files.

Changes to one network device may on many levels affect the current parameterization of other network devices. In such circumstances, the installation of a new network device or the modification of an existing network device may require the modification of certain operating features and protocols. For instance, the addition of drive 500 in the previous examples, may have necessitated the change in operating parameters of other network devices.

As shown in FIG. 4, a network comprised of a plurality of network controllable devices may be controlled by a single master controller such as CNC 200. For polling purposes and network fault location, the addition and designation of drive/motor set 1 to system address "0001" may necessitate the re-addressing of drive/motor sets 2 and 3. Such a change is necessary if the physical location and order of the drives is important. Operationally, the installation of drive/motor set 1 requires the modification of the CNC configuration file and configuration data in affected process network devices.

A change in the configuration file of CNC 200 under any of the above embodiments will, if required, create a file containing one or more commands to modify affected process network devices. During the modification or creation of a new configuration file, the CNC processor 222 determines the need for altering the operating features of its controlled network devices. More specifically, the addition of drive/motor set 1 will cause the automatic generation of a command file to re-address drive/motor sets 2 and 3 to addresses "0002" and "0003" from their previous designation of "0001" and "0002" respectively. The set of commands are sent to both drive/motor sets 2, and 3 for execution through process control network 300. In this manner, configuration changes can be made to other affected network devices at the same time that configuration changes are made to one network device.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub-ranges therein.

What is claimed is:

1. A method of generating a configuration file in a control processor from one or more barcode encoded data, the steps comprising:

detecting with an optical scanner a set of barcode encoded configuration parameters of a control component on a control system wherein the control processor controls the operation of the control component;

decoding within the optical scanner the detected set of barcode encoded configuration parameters;

transmitting signals to the control processor, the signals representative of the decoded set of barcode encoded configuration parameters;

detecting the transmitted signals at the control processor;

decoding within the control processor, the transmitted signals containing control component specific configuration parameters;

storing the control component specific configuration parameters in memory associated with the control processor; and generating and storing the configuration file in said memory, the configuration file containing the component specific configuration parameters for controlling the operation of the control component.

2. The method of claim 1, further comprising the step of storing the decoded parameters in an optical scanner memory and batch transferring the parameters to the control processor.

3. The method of claim 1, wherein in the step of detecting the set of barcodes comprises using an RF scanner and wirelessly transmitting the parameters to the control processor.

4. The method of claim 1, wherein the optical scanner is an integrated module within the control processor.

5. The method of claim 1, wherein the optical scanner is portable and attachable to the control processor.

6. The method of claim 1, wherein the barcode encoded configuration parameters comprise a first set of parameters designating physical attributes of the control component and a second set of parameters designating operational features of the control component.

7. The method of claim 6, wherein the first set of parameters is included within a barcode encoded serial number of the control component.

8. The method of claim 6, further comprising the step of correlating one or more of the configuration parameters individually within the first set of parameters with a set of predetermined parameters stored in memory for designating the physical attributes of the control component.

9. The method of claim 6, further comprising the step of correlating one or more of the configuration parameters individually within the second set of predetermined parameters stored in memory with a set of parameters designating operational features of the control component.

10. The method of claim 1, further comprising the step of using one or more of the barcode encoded configuration parameters individually to correlate with a predetermined set of operating parameters stored in memory for generating the configuration file.

11. The method of claim 1, wherein the step of decoding within the control processor comprises using a sequence table to identify the configuration parameters.

12. A method of generating a configuration file in a Computer Numerical Control (CNC) from barcode encoded data, the steps comprising:

detecting with a barcode scanner a set of barcode encoded configuration parameters of a control component to be added to a control system wherein the CNC controls the operation of the control component;

decoding within the barcode scanner the detected set of barcode encoded configuration parameters;

transmitting signals to the CNC representative of the decoded set of barcode encoded configuration parameters;

detecting the configuration parameters at the CNC;

transmitting the configuration parameters to a remote computer;

executing a configuration tool at the remote computer, wherein the decoded configuration parameters are used as input data to input requirements of the configuration tool;

transmitting back to the CNC an XML file containing the configuration data to be used in configuring the control component;

storing at the CNC the control component specific configuration parameters in local memory accessible by a CNC processor; and generating and storing the configuration file containing the component specific configuration parameters for controlling the operation of the control component.

13. The method of claim 12, wherein the step of detecting the configuration parameters at the CNC comprises using a sequence table to identify the configuration parameters.

14. The method of claim 12, further comprising the step of storing the decoded parameters in a barcode scanner memory and batch transferring the parameters to the CNC.

15. The method of claim 12, wherein in the step of detecting the set of barcodes comprises using an RF scanner and wirelessly transmitting the parameters to the CNC.

16. The method of claim 12, wherein the barcode scanner is an integrated module within the CNC.

17. The method of claim 12, wherein the barcode scanner is portable and attachable to the CNC.

18. The method of claim 12, wherein the barcode encoded configuration parameters comprise a first set of parameters designating the physical attributes of the control component and a second set of parameters designating the operational features of the control component.

19. The method of claim 18, wherein the first set of parameters is included within a bar encoded serial number of the control component.

20. The method of claim 18, further comprising the step of correlating one or more of the configuration parameters individually within the first set of predetermined parameters stored in memory with a set of parameters designating physical attributes of the control component.

21. The method of claim 18, further comprising the step of correlating one or more of the configuration parameters individually within the second set of predetermined parameters stored in memory with a set of parameters designating operational features of the control component.

22. The method of claim 12, further comprising the step of using one or more of the barcode encoded configuration parameters individually to correlate with a predetermined set of operating parameters stored in memory for generating a configuration file.

23. The method of claim 12, wherein the configuration data sent back to the CNC in XML format contains only a set of input data to be entered into a configuration tool at the CNC for generating a configuration file.

24. The method of claim 12, further comprising the step of sending a serial number of the control component to the remote computer for use in generating the configuration data sent back to the CNC in XML format.

25. The method of claim 24, further comprising the step of correlating the serial number at the remote site with a sequence table.

26. The method of claim 25, further comprising the step of using the sequence table to determine the configuration parameters of the control component.

27. A method of generating a configuration data in a Computer Numerical Control (CNC) from barcode encoded data, the steps comprising:

detecting with a barcode scanner a set of barcodes encoded configuration parameters of a control component to be added to a control system wherein the CNC controls the operation of the control component;

decoding within the barcode scanner the detected set of barcode encoded configuration parameters;

transmitting signals to the CNC representative of the decoded set of barcode encoded configuration parameters;

detecting the transmitted signals at the CNC;

executing a configuration tool, wherein the decoded configuration parameters are used to function as input data to the input requirements of the configuration tool;

storing the control component specific configuration parameters in memory accessible by a CNC processor;

determining whether other control components require modification to configuration parameters of the respective control components, if so, generating a command file in XML format contain instructions for one or more of the other control components to modify the set of configuration parameters;

generating and storing an executable configuration file containing the component specific configuration parameters for controlling the operation of the control component.

28. The method of claim 27, further comprising the step of transmitting the command file to one or more of the control components over a network.

29. A system for updating a configuration file from one or more barcode encoded data, the system comprising:

a Computer Numerical Control (CNC);

a control component;

a remote computer in communication with the CNC;

a barcode scanner for detecting a set of barcode encoded configuration parameters of the control component to be added to a control system wherein the CNC controls the operation of the control component, the barcode scanner comprising a reader section for converting barcode images to electrical signals, and a decoder section for converting the electrical signals into useable data;

means for transmitting the useable data to the CNC;

means for detecting the configuration parameters at the CNC;

means for transmitting the configuration parameters to a remote computer;

a configuration tool resident and operational at the remote computer for generating a configuration file;

means for transmitting back to the CNC an XML file containing the configuration file to be executed in controlling the control component;

means for storing the control component specific configuration parameters in local memory accessible by a CNC processor; and means for generating and storing an executable configuration file containing the component specific configuration parameters for controlling the operation of the control component.

30. The system of claim 29, wherein the configuration file in XML files contains only a set of input data to be entered into a configuration tool at the CNC.

31. The system of 29, further comprising the step of generating a configuration file for another control component affected by the addition of the control component.

32. The system of claim 29, further comprising processing means for correlating the serial number at the remote site with a sequence table.

33. The system of claim 29, wherein said processor means includes means for using the sequence table to determine the configuration parameters of the control component.

34. The system of claim 29, further comprising a barcode software resident within the decoder section for using an alpha-numeric set of barcodes.

35. The method of claim 29, further comprising the step of using software in a reader section of barcode scanner to generate a signal to a decoder section of the barcode scanner.

36. The method of claim 29, further comprising the step of using a barcode sequence to enter an operational program within the CNC.

37. The system of claim 29, further comprising means for generating at the remote computer a set of instructions based on the control component serial number and operating parameters.

38. The method of claim 29, further comprising means for transmitting the set of instructions to the CNC in XML form.

\* \* \* \* \*